April 14, 1942.　　D. C. ROCKOLA　　2,279,874
ROAD VEHICLE
Filed Feb. 20, 1939　　2 Sheets-Sheet 1
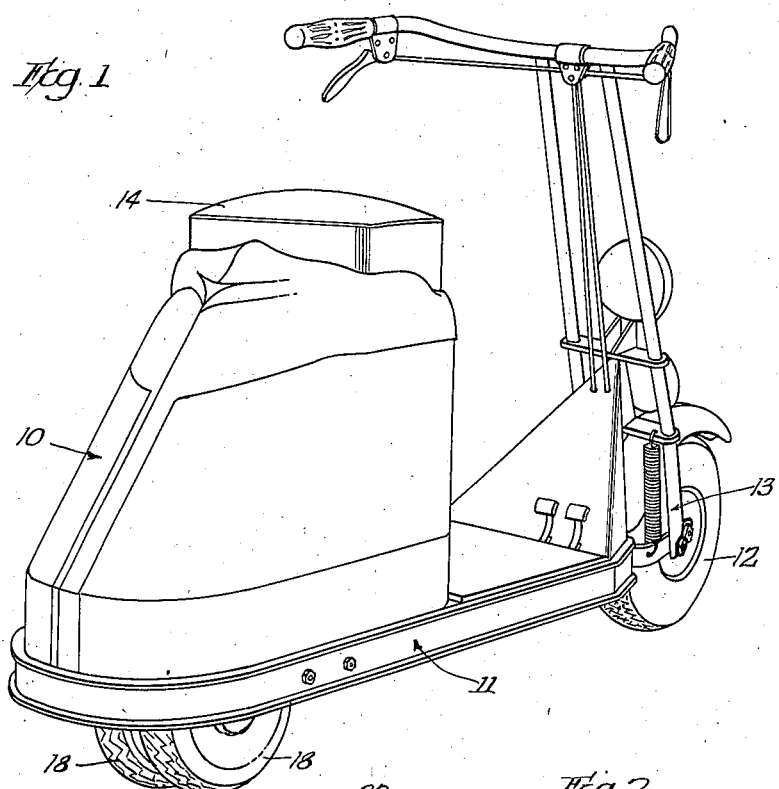
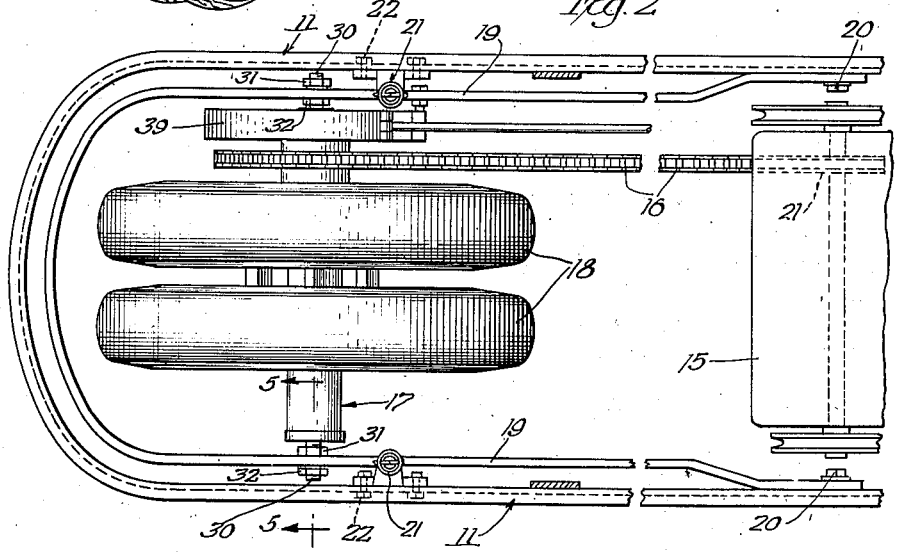
Inventor
David C. Rockola April 14, 1942. D. C. ROCKOLA 2,279,874
ROAD VEHICLE
Filed Feb. 20, 1939 2 Sheets-Sheet 2
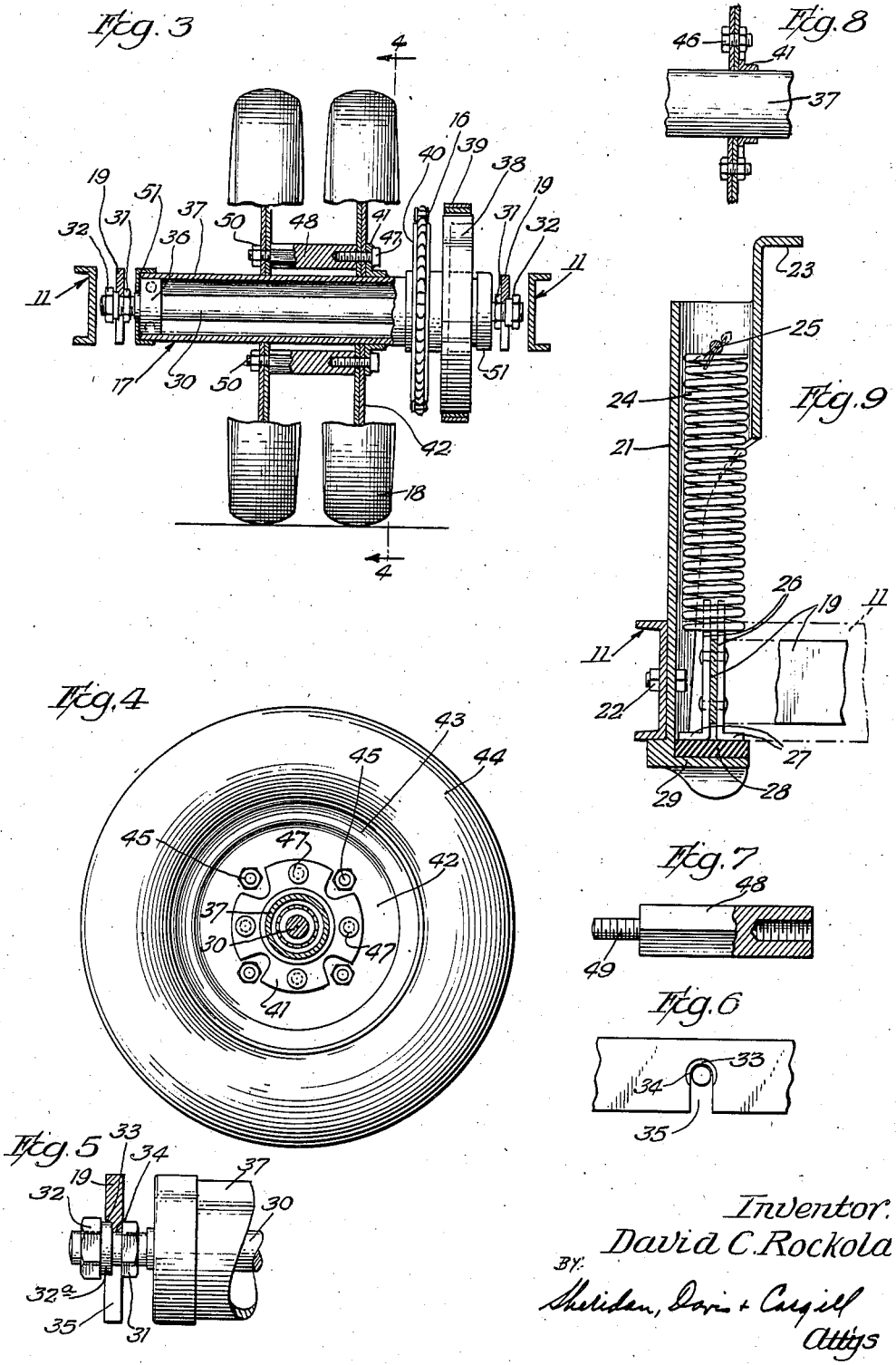
Inventor:
David C. Rockola
BY Sheridan, Davis + Cargill
Attys Patented Apr. 14, 1942

2,279,874

UNITED STATES PATENT OFFICE 2,279,874

ROAD VEHICLE

David C. Rockola, Chicago, Ill., assignor to Rock-Ola Manufacturing Corporation, Chicago, Ill., a corporation of Delaware Application February 20, 1939, Serial No. 257,395

1 Claim. (Cl. 180—30)

This invention relates to road vehicles.

One object of the invention is to provide an improved wheel mounting for road vehicles whereby a drive wheel or pair of drive wheels may be removed from or replaced on an axle assembly without difficulty notwithstanding that the wheels are enclosed or partially enclosed by the vehicle body and its supporting frame.

A further object of the invention is to provide improved wheels and improved means for attaching one or a pair of the same to a drive axle.

Other objects of the invention relate to various features of construction and arrangement of parts which will be apparent from a consideration of the following specification and accompanying drawings, wherein:

Fig. 1 is a perspective view of a road vehicle of the so-called scooter-type, the vehicle illustrated in said figure being provided with dual drive wheels;

Fig. 2 is a horizontal sectional view of the rear portion of the chassis, the casing or body thereof removed;

Fig. 3 is an elevation of the rear wheels and mounting means therefor and associated parts, portions being shown in section;

Fig. 4 is a sectional elevation taken on line 4—4 of Fig. 3;

Fig. 5 is an enlarged broken section taken on line 5—5 of Fig. 2 illustrating the attaching means for the ends of the drive shaft;

Fig. 6 is an elevation of the structure shown in Fig. 5 looking to the right, the outer nut on the end of the axle being removed;

Fig. 7 is a broken elevation of one of the wheel spacing and attaching members illustrated in Fig. 3;

Fig. 8 is a broken elevation of the rear axle assembly showing but one wheel mounted thereon; and Fig. 9 is a broken vertical sectional view of one of the rear shock absorbing or cushioning members.

In the drawings, the vehicle illustrated generally comprises a body 10 carried by a main or outer frame 11 preferably of channel form in cross section and supported at its forward end by a front wheel 12 and a steering fork mechanism indicated generally by the numeral 13, such mechanism per se being no part of the present invention. The frame 11 supports not only the body 10 and a passenger seat 14 but a motor 15 also shown fragmentarily in Fig. 2. The motor is adapted, under the control of the operator, to drive the chain or other flexible drive means 16 for operating the drive axle assembly indicated generally by the numeral 17. On this assembly may be mounted either one or more drive wheels 18 as will be described hereafter.

The rear portion of the main or outer frame 11 is of U-shape in plan view as shown in Fig. 2 and within the same an inner or auxiliary frame 19 is pivotally attached at 20 as shown in Fig. 2. The pivotal axis of the frame 19 is in alignment with the axis of rotation of a drive sprocket 21 which is operated by the motor 15 by any suitable transmission mechanism. The inner frame 19 is also attached to or connected with the outer frame at points located rearwardly of the axis of the pivots 20 by cushioning structures adapted to respond to imposed loads carried by the vehicle and to shocks imparted to the rear wheels during use.

This shock absorbing or cushioning attachment of the inner frame to the outer frame is not per se a part of the present invention but is more particularly shown and described in my copending application, Serial No. 257,396, filed February 20, 1939, now Patent No. 2,243,124. Briefly, this construction as illustrated in Fig. 9 comprises a semitubular member 21 secured to the outer frame 11 as at 22 and which, at its upper end, is provided with a flange 23 which may form one support for the body and seat construction. Within the member 21 is a compression spring 24 anchored to the tube at its upper end by a cross pin or abutment member 25 and at its lower end resting against the upper edge of one side member of the U-shaped inner or auxiliary frame 19. The lower end of the spring is retained in proper position by any suitable means such as by the upper projecting ends of spring guides 26 which are attached to the inner frame 19 and at their lower ends terminate in oppositely directed feet 27 which may bottom on a pad of cushioning material such as rubber 28 carried by the lower flange 29 which may be formed as a part of the spring guide 21. The feet and pad act as cooperating stops to limit upward movement of the main frame. It will be seen that as weight is imposed on the body or seat of the vehicle, it is transmitted through the cushion mounting above described at each side of the vehicle to the inner frame 19 to which the rear axle assembly 17 which carry the road wheels 18 is attached. Such loads, if sufficient to compress the springs 24 cause the main frame to be lowered and the pad 28 to move downwardly from the feet 27. The construction thus provides a floating or cushioned mounting for the rear of the vehicle body.

The rear axle assembly as shown in Fig. 3 comprises an axle 30, the ends of which are threaded and are provided with nuts 31 or like stop members disposed in contact with the inner vertical surfaces of the respective longitudinal portions of the U-shaped inner frame 19. The outer threaded ends of the axle 30 are provided with nuts 32 (see Fig. 5), which nuts are provided with cylindrical bosses 32a adapted to seat in recesses 33 (see Fig. 6) formed in the outer surfaces of the sides of the frame member 19.

The recesses 33 are concentric with horizontal apertures 34 in the side members of frame 19 through which the ends of the axle 30 project as shown in Figs. 3 and 5. The diameter of the recesses 33 is greater than the diameter of the apertures 34 and extending downwardly from the latter are slots 35 preferably of the diameter of the apertures.

As shown in Fig. 6, the horizontal walls of the recesses 33 extend arcuately throughout more than 180° and hence when the cylindrical bosses 32a are positioned therein, as shown in Fig. 5, the axle assembly is locked to the inner frame 19 against vertical displacement. By screwing the nuts 32 outwardly, however, a distance to free the bosses 32a from the recesses 33, the axle may be moved downwardly relatively to the frame 19 through the vertical slots 35. This may be accomplished by turning the vehicle over on its side or by lifting up or jacking up the main frame 11. It will be apparent, therefore, that by releasing the axle 30 as described and moving the latter relatively downwardly from the frame 19, the wheel or wheels carried by the axle assembly may be removed from or replaced on the assembly.

The axle 30 being anchored to the frame 19 in use does not turn. Journaled on the axle, however, by means of bearings 36 adjacent each end of the latter, only one being shown in Fig. 3, is a driven sleeve 37 which may carry a brake drum 38 provided with an external contracting brake band 39, and a drive sprocket 40 over which the chain 16 passes for imparting driving motion to the rear wheel assembly. Also attached to the sleeve 37 is a wheel abutment or anchoring member preferably in the form of a radially extending flange 41 which may be welded to the sleeve, if desired, or otherwise secured thereon.

The wheels 18 preferably are formed of a pair of mating discs 42 each having a partial rim 43 at its outer periphery upon which a pneumatic tire 44 may be mounted. A pair of discs constituting a wheel 18 are clamped together by means of a plurality of bolts 45 (see Fig. 4) after inserting the same in the tire casing. The ready separation of the discs renders removal of a casing from the wheel convenient and thus facilitates making repairs to the casing or the inner tube (not shown) or the replacement of tires.

The assembled wheel is secured to the wheel abutment member 41, where one wheel only is employed on the axle assembly, by means of bolts 46 as shown in Fig. 8, in which instance the flange 41 is located centrally of the axle assembly. Where two wheels are employed on the rear axle assembly, however, bolts 47 are employed which pass through openings in the member 41 and through registering openings in the disc portions of the adjacent wheel 18 into threaded apertures of spacing studs or members 48. These members 48 preferably are hexagonal or otherwise shaped for the reception of a socket wrench for turning the same firmly on the bolts 47 for tightening the adjacent wheel to the member 41. The outer ends of the members 48 may be provided with threaded recesses for receiving similar bolts passed through a second wheel or said ends may terminate as shown in Fig. 7 in threaded studs 49 which pass through registering openings in a second wheel as shown in Fig. 3 and receive nuts 50 on their outer ends for securing said wheel in position.

It will be apparent that either or both wheels may be removed from the axle assembly by first releasing nuts 32 and dropping the axle relatively to the frame 19 a distance sufficient to enable the wheels to be slid from the left-hand end of the sleeve 37 shown in Fig. 3 after removing the nuts 50, spacing members 48 and the bolts 47. In removing the wheel or wheels as described, a dust-guard 51 provided at the end of the sleeve 37 is of course also removed as by sliding the same to the left as viewed in Fig. 3 where the same has a frictional fit on the sleeve or by unscrewing it therefrom if the members have a threaded connection.

While I have shown and described certain embodiments of my improvements for the purpose of illustration, it will be apparent that various changes may be made therein without departing from the spirit of the invention.

What I claim as new and desire to cover by Letters Patent is:

A road vehicle comprising a U-shaped frame having opposite open slots in the lower edges of the arms thereof, a driven axle assembly extending transversely of said frame and having ends located in said slots, a wheel abutment flange secured to said axle assembly intermediate the frame members, an axle driving member on the axle located between the flange and one of said frame arms, a wheel on said assembly having a central recess therein to enable the wheel to be slid longitudinally of the axle assembly, means for releasably securing the wheel in abutting contact with the side of said flange opposite said axle driving member, and means on the ends of said axle for releasably securing the same to said slotted portions of the frame arms whereby upon release of the wheel from said flange and release of the axle from said slots the axle and wheel can be lowered with respect to said frame sufficiently to enable the wheel to be slid along the axle and off the end thereof remote from the driving member.

DAVID C. ROCKOLA.